Sheet 1 - 3 Sheets.

Akins & Felthousen.

Sewing Machine.

No 1930

Reissued Apr. 11, 1865.

Witnesses

B S Renwick

H L Benson

Assignee

W G Fairbanks

Akins & Felthousen.

Sewing Machine.

No. 1930 Reissued Apr. 11, 1865.

Witnesses
C. S. Rennick
T. W. C. Bennem

Assignee: N. C. Fairbanks

Akins & Felthousen.

Sewing Machine.

No. 1930

Reissued Apr. 11. 1865.

Witnesses:

C. S. Renwick

W. L. Benson

Assignee.

R. G. Faulkner

UNITED STATES PATENT OFFICE.

R. G. FAIRBANKS, OF NEW YORK, N. Y., ASSIGNEE, BY MESNE ASSIGNMENTS, OF W. H. AKINS AND J. D. FELTHOUSEN.

IMPROVEMENT IN SEWING-MACHINES.

Specification forming part of Letters Patent No. 8,282, dated August 5, 1851; Reissue No. 1,358, dated January 20, 1863; Reissue No. 1,930, dated April 11, 1865.

*To all whom it may concern:*

Be it known that WILLIAM H. AKINS and J. D. FELTHOUSEN, of Ithaca, in the county of Tompkins and State of New York, did obtain Letters Patent for an invention of certain Improvements in Sewing-Machines; and that I, REUBEN G. FAIRBANKS, of the city, county, and State of New York, have had assigned to me the full and exclusive right to the said invention as secured to the said AKINS and FELTHOUSEN by the said Letters Patent; and I do hereby declare that the following is a full, clear, and exact description of the same, reference being had to the accompanying drawings, forming part of this specification, in which—

Figure 1:
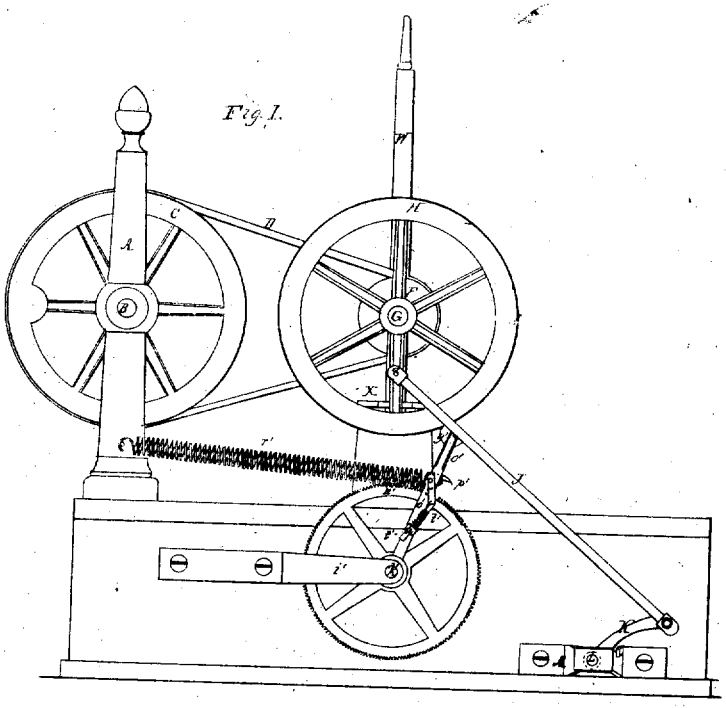
Figure 4:
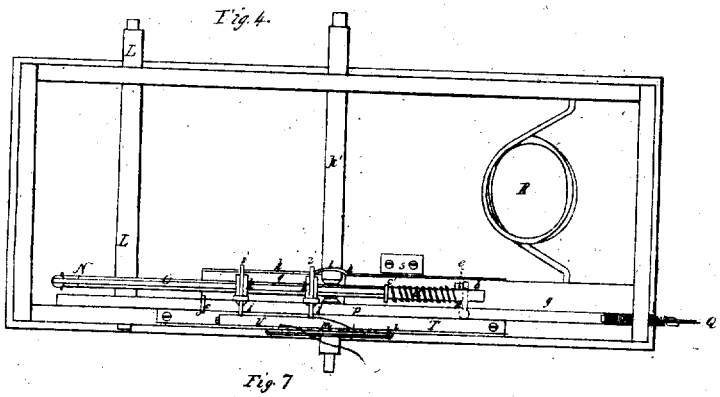
Figure 7:
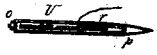
Figure 2:
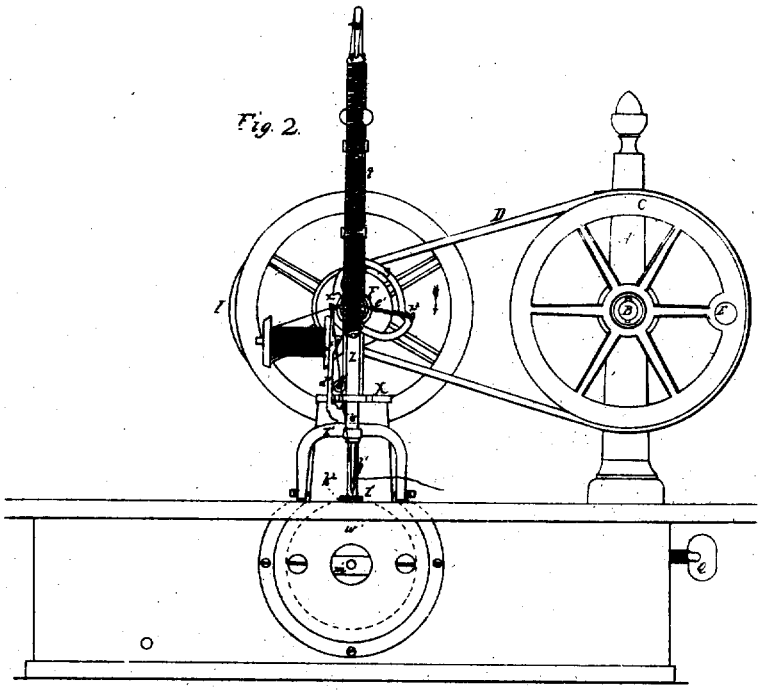
Figure 5:
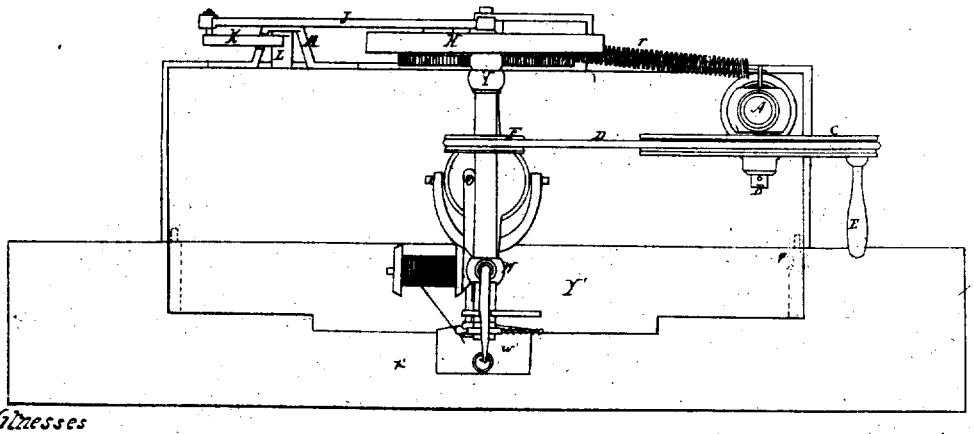
Figure 3:
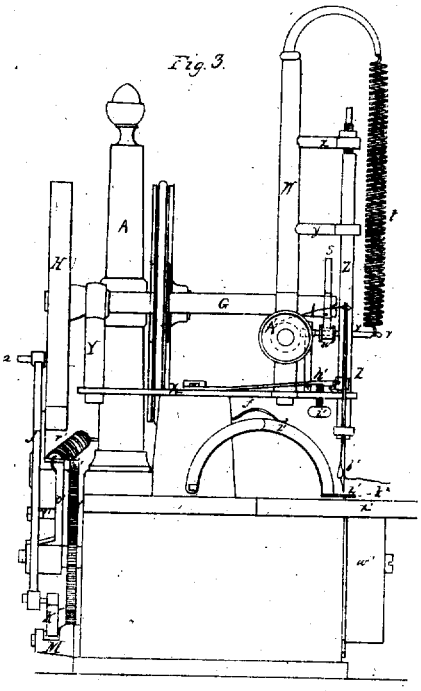
Figure 6:
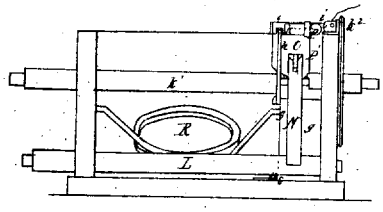

Figure 1 represents a view from the rear of the machine, with a portion of the parts on the opposite side removed. Fig. 2 is a view of the front of the machine, with a portion of the rear (which is represented in Fig. 1) removed. Fig. 3 is an end view from the left of the machine. Fig. 4 is a top view of the interior of the machine, taken underneath the table and shield. Fig. 5 is a top view of the machine with the table and shield in place. Fig. 6 is a view exhibiting the parts underneath the table of the machine as they would be seen on the removal of the left-hand end of the box in which they are inclosed. Fig. 7 is a view of the shuttle, taken on the side which works next the needle.

Similar letters of reference indicate corresponding parts in the several figures.

The first part of the invention consists of the combination of the needle-bar of a sewing-machine with a spring, or its equivalent, operating to draw up the needle after the stitch is formed for the purpose of tightening the stitch, in manner similar to hand-sewing.

The second part of the invention consists of the combination of the stitch forming mechanism and spindle or other holder for the bobbin or spool of thread with a spring and arm, or their equivalent, for the purpose of gripping and making friction upon the needle-thread intermittently between the spool and the seam.

The third part of the invention consists of the combination of the needle-bar and shuttle-driver of a sewing-machine with mechanism operating in such manner that the shuttle is caused to enter between the needle and its thread, while the needle is arrested after having made a short retrograde movement.

The fourth part of the invention consists of the combination, in a sewing-machine, of the stitch-forming mechanism with a cylindrical rest for the purpose of supporting and affording convenience for sewing articles of a curved or tubular form.

The fifth part of the invention consists of the combination, in a sewing-machine, of a toothed feeding-instrument with reversible mechanism for driving it in such manner that the said mechanism may be set to change the direction in which the feeding-instrument moves the material without stopping the machine to displace its parts.

The machine is constructed to form stitches by means of a reciprocating needle and a reciprocating shuttle acting in combination, and its various moving parts are supported by a hollow stand or bed-piece.

On a column, A, erected upon the stand or bed piece of the machine, is arranged an axle, B, which carries the main driving-wheel C, which may be turned by the handle E or driven by any other suitable means, and which carries a belt, D, running over and driving a pulley, F, which is fast on the horizontal shaft G, which carries a cam, S, to be hereinafter more fully described, for driving down the needle through the cloth and governing its retraction therefrom, and a fly-wheel, H, which has on its periphery a cam, I, for operating the feeding apparatus, and has attached to one of its arms a wrist-pin, *a*, for operating the shuttle-driving apparatus. The said shaft G is fitted to bearings in uprights V W, which are secured to a horizontal plate, X, supported upon and firmly secured to a pillar, Y, standing on the top of the stand or bed-piece of the machine. The upright W is extended upward above the said shaft, and has attached to it an arm, *y*, which contains one of the guides for the upright needle-bar Z, another guide for the said bar being provided in the plate X. This bar has its lower end bored out to receive the straight needle *b'*, which has its eye in or near the end thereof, and a recess immediately behind said eye for the purpose of affording an entrance for the point of the shuttle between the said needle and the thread which it carries. The end of this bar is also slit longitudinally and made tapering, and a screw-thread is cut upon it, and when the needle is in proper place in the needle-bar a nut is screwed onto the end of said needle-bar for the purpose of pressing its sides toward each other and holding the needle in place.

The needle-bar Z has an arm, *v*, passing through and secured to it, and the said arm carries behind the bar a friction-roller, *w*, Fig. 3, upon which the cam S (rotating in the direction of the arrow shown in Fig. 2) operates to drive down the needle through the cloth and govern its retraction therefrom, which is effected by a spiral spring, *t*, one end of which connects with the arm *v* and the other with a goose-neck on the top of the upright W, the said spring keeping the friction-roller *w* in contact with the cam until the needle is drawn up clear of the cloth, when the friction-roller *w* is suddenly drawn into a recess, *x*, Fig. 2, in the cam, allowing the spring to suddenly contract and jerk the needle-thread to tighten up the stitches. The needle-bar is arrested in its upward motion by coming in contact with the end of a set-screw fitted into an arm, *z*, attached to the upright W, and this screw may be adjusted to arrest the needle in a higher or lower position, according as the thickness of the cloth is greater or less.

The cam S is so formed with a step, as shown at $x^2$, Fig. 2, that after it has forced the needle down to the lowest position it permits it to rise or make a retrograde movement very suddenly, and from this step it is concentric with the shaft G for a considerable distance, so that by its continued revolution in contact with the roller *w* it arrests the needle bar for some time, during which the point of the shuttle U passes between the needle and the thread which lies beside it. By the slight retrograde movement above mentioned the needle and thread are brought to a more favorable position for the shuttle to pass between them, and by the arrest of the needle the needle-thread (which is represented in blue color) is prevented having any upward movement which might interfere with the entrance of the shuttle between it and the needle. The thread is supplied to the needle from a spool, A′, which turns on a spindle attached to the upright W.

The needle-bar Z has hinged to it at a short distance above the needle an arm, *d′*, which extends upward beside the needle-bar, and whose upper end passes through an eye in a curved arm, *e′*, which passes freely through the needle-bar, and which has a spiral spring coiled round it and applied in such a manner as to draw its eye toward the needle-bar. The thread, on its way from the spool A′ to the eye of the needle, passes through the eye of the curved spring-arm *e′*, between the said eye and the arm *d′*. On the upright arm *d′* is a wedge-shaped or cam-like projection, *f′*, which, as it descends with the needle-bar, strikes against a friction-roller, *g′*, Fig. 2, on a spring-arm, *h′*, Fig. 3, which is secured to the plate X, before mentioned, and forces out the said arm *d′* in the arc of a circle, and thereby strains or contracts the spring on the curved arm *e′*, and by that means causes the thread which is passing through the eye of the said curved arm to be clamped by the friction of the upright arm *d′* upon it. The spring on the curved arm *e′* always causes some friction to be produced on the thread passing through its eye, but most at the time the needle is at its lowest position. The object of this friction upon the thread between the spool and the seam is to keep it under control and prevent any more being drawn off from the spool than is necessary to produce the stitch, so that the thread for the successive stitches may be drawn from the spool in measured lengths by the act of making the stitches. The roller *g′* may be so adjusted that the wedge-shaped or cam-like projection *f′* on the arm *d′* may be acted upon at the proper time for producing the greatest friction or pressure on the thread by means of a set-screw, *i′*, Fig. 3, screwing through the plate X and bearing upon the spring-arm *h′*, so that the spring-arm *h′* may be raised or lowered. The thread, instead of passing through the eye of the curved spring-arm *e′*, may pass through a hole near the end of the spring-arm *h′*, immediately over the set-screw *i′*, and be held by the friction of said set-screw on said arm, and thence through the slot in the end of the needle-bar Z to the eye of the needle.

The shuttle U travels in a straight raceway, T, which is so arranged that the straight needle works in a recess, *m*, Fig. 4, provided in one side thereof, and through a hole in the bottom thereof. The recess *m* is large enough to receive the needle, the side of the shuttle-race in which it is formed being flat, and its object is twofold—viz., first, to prevent the needle interfering with the movement of the shuttle, and, second, to prevent the thread winding round the needle or getting out of a favorable position for the shuttle to pass between it and its thread. The raceway is exhibited in Figs. 4 and 6 and the recess *m* in Fig. 4. The shuttle is made hollow, and with the open side, which works next the flat side of the raceway in which the recess *m* is formed, perfectly straight, and the other three sides sloped off to form a thin and pointed or nearly pointed front extremity, capable of entering freely between the needle and its thread. The rear extremity of the shuttle may be square or rounded. On the inside of the shuttle is placed a spindle, *n*, for carrying the locking-thread, which is represented in green color, the said spindle being secured in place by a nut, *o*, in the rear of the shuttle, on the outside thereof, as shown in Fig. 7. In the front part of the inside of the shuttle is the bar *p*, through a hole in which passes the shuttle-thread, which passes from thence behind a spring, *r*, on the side of the shuttle, also on the inside, and then through a hole in the top of the shuttle, as shown in Fig. 4. The thread is drawn off from the spindle lengthwise, and by this means obviates the necessity of a bobbin on the spindle and admits of the use of a smaller shuttle. The bar and spring above mentioned afford sufficient friction on the thread to prevent it from drawing off any faster than it is required for catching the needle-thread and forming its part of the stitch.

The shuttle is driven in the following manner: The wrist-pin *a*, before mentioned, is connected by a rod, J, with an arm, K, secured to the rear end of a shaft, L, having its bearing at that end in a bolster, M, secured to the outside of the bed-piece of the machine, said shaft passing through the bed-piece and having its opposite end resting in a bearing in the opposite side thereof, and which said connecting-rod gives to said shaft a rocking motion. To the shaft L is secured an arm, N, which is slotted in its end to receive one end of the connecting-rod O, which is attached by a joint-pin. The other end of said connecting-rod is slotted and receives one end of a pin, *b*, which is firmly secured to the driving-bar P, Fig. 4. On the connecting-rod O is arranged a collar, *c*, against which rests one end of a spiral spring, *d*, the other end of which rests against a key, *e*, which travels in the slot in the connecting-rod and is forced up tight by said spring *d* against the pin *b*, so that the said pin will carry the driving-bar P back and forth as it is operated upon by the connecting-rod until the driving-bar P strikes against the end of a set-screw, Q, in the end of the bed-piece of the machine, when the spiral spring will yield, the slot in the connecting-rod permitting it to move on, while the key *e* and pin *b* are stationary, thereby allowing a continuous motion of the connecting-rod to be kept up, while the driving-bar P, and consequently the shuttle which it drives, remains for a moment stationary, so that the needle may draw up that portion of the stitch made simply by passing the shuttle through between the needle and its thread. After the connecting-rod has made its entire stroke and is returned by the operation of the arm N, to which it is attached, the key *e* and pin *b* remain at rest (the spiral spring *d* expanding and filling up the space between the key *e* and the collar) until the end of the said slot (which slot, or rather the end of said slot, is represented by a dotted line in Fig. 4) reaches the pin *b*, when the continued return motion of the connecting-rod brings back the driving-bar and the shuttle with it. By means of the set-screw Q, before mentioned, the distance which the shuttle shall travel and then stop may be regulated so that it shall only move far enough to clear the needle; or the precise time it shall remain still may be regulated to suit the motion of the needle when the movement of the latter is adjusted by the set-screw provided for that purpose for sewing thicker or thinner material.

The driving-bar P is guided in its proper direction by and moves in a support, *f*, fastened to the inside of the bed-piece of the machine, in rear of the shuttle, and its front end is bent down at right angles to the said bar, as seen at P′, Fig. 6, and slides in a groove in a support, *g*, which is hinged to the bottom of the bed-piece of the machine by the hinge *s*, and behind which support is a spring, R, for keeping it close up against the side of the machine. The hinge and spring are for the purpose of allowing the said support to be pushed back to permit the pointed arms *i i*, by whose agency the bar P drives the shuttle, to be pushed back, so as to draw the points of said arms out of the holes provided in the shuttle to receive them, (one of said holes being represented by dotted lines in Fig. 6.) when it becomes necessary to take out the shuttle for the removal of the thread therein, and when the shuttle is replaced the said spring R forces the arms *i i* into place again.

On the rear of the support *g* is secured a curved guide, *h*, along which move the arms *i i*, said arms being notched near their rear ends, as shown in Fig. 6, so as to span said guide and be governed in their movements by it. The said arms are each fitted to work through a slotted sleeve, *k*, which is secured to the driving-bar P, and by that means their points are permitted to be moved into and drawn out from the holes or recesses provided in the back side of the shuttle to receive them, as they are directed by the curve in the guide *h* while they are carried by the driving-bar. The curve *l* in the guide *h* is for drawing the arms *i i* alternately out of the shuttle for the purpose of allowing them to pass or step over the needle-thread as the shuttle passes between the needle and its thread, and when the said arms come to the straight part of the guide *h* they are immediately entered again, so that one of said arms is always in position to drive the shuttle. The curve in the guide is made immediately opposite the needle, so as to draw back the arm at that point.

Through the center of the stand or bed-piece there passes the horizontal shaft *k′*, Figs. 1, 2, 4, and 6, which carries the toothed feeding-wheel $k^2$, and has its bearings in bar *i′*, Fig. 1, in the rear of the stand, and in a bar, *m′*, in the front thereof. The toothed feeding-wheel $k^2$ is a disk-wheel with teeth upon its rim, and it is so arranged and applied that its toothed peripherical surface projects upward through a slot or opening of suitable size in the bearing-surface, on which the cloth or material to be sewed is supported during the sewing operation, far enough to catch the under side of the said material when the latter is held in contact with it by suitable pressure applied above it, and to enable it to move the said material along the said surface by its revolution. This bearing-surface may be either the exterior of a cylinder-shaped rest, *w′*, Figs. 2, 3, and 5, attached to the front of the bed-piece of the machine in such a manner as to incase the feed-wheel, like a box, or it may be the upper surface of a flat table, *x′*, which forms a continuation of the plain upper surface of the bed-piece of the machine. Either the table *x′* or the rest *w′* provides a support for the cloth all around the needle and the operating-surface of the feed-wheel. The rest $w'$ is principally intended to be used in sewing seams in articles of curved or hollow forms—such, for instance, as those around coat-sleeves or pantaloons, and the seams of boot-legs—and the flat table $x'$ for sewing seams on a flat surface. The table $x'$ has to be removed when the rest $w'$ is to be used, and for that purpose is attached to the bed-piece of the machine by dowel-pins. The feeding-wheel $k^2$, Figs. 4 and 6, should operate as close as practicable to the needle.

$z'$ is a what is termed the "cloth-holder," consisting of a small plate attached to a forked arm, which is connected with the pillar Y by center screws or hinges, and which has a spring, $f$, applied to it in such a manner as to exert a downward pressure upon it to make it bear upon the cloth or other material with sufficient force to confine it to the part of the toothed surface of the feeding-wheel which projects above the surface of the table $x'$ or rest $w'$, and thereby insure the movement of the cloth by the teeth of the feeding-wheel; but the said spring allows the said cloth-holder to yield to permit the passage under it of the cloth of different or varying thicknesses. The surface of this cloth-holder which bears upon the material is made quite smooth in order that the material may slide freely under it when moved by the revolution of the feeding-wheel. The said cloth-holder has its bearing-surface larger than is necessary to confine the material to the feed-wheel, as it serves also to prevent the needle from raising up the material in drawing up the stitch; and in order that the said cloth-holder may bear upon the material all round the needle, or on both sides of the plane passing through the needle parallel with the plane of revolution of the feed-wheel, it has a hole provided in it just large enough for the needle and thread to pass easily through.

On the rear end of the feeding-wheel shaft $k'$ is secured a rag-wheel, $n'$, and close to this wheel an arm, $o'$, is fitted to the said shaft. To the said arm is attached a pawl, $p$, which engages with the said rag-wheel for the purpose of producing the necessary movement of the shaft for feeding the material to be sewed, as will be presently described. On the extreme end of the arm $o'$ is placed a friction-roller, $g'$, which is struck by the cam I on the fly-wheel H, during every revolution of the latter, and thereby caused to move the pawl $p'$ over the teeth of the rag-wheel, at the same time elongating a spiral spring, $r'$, which connects the said arm $o'$ with the pillar A of the machine, and after the cam passes the roller the pawl catches into the teeth of the rag-wheel $n'$, and the contraction of the spring $r'$ draws the arm $o'$ in the opposite direction to that in which it was moved by the cam and causes the pawl to move the rag-wheel the necessary distance to cause the toothed wheel $n'$ to feed the material the necessary distance for the length of a stitch. The pawl is a double-headed one—that is to say, it has a beak at each end—and it is attached to the arm $o'$, midway between its beaks or extremities, by a pin which passes through the said arm, and which has secured to its other end an arm, $s'$, which projects downward, and which has at its lower end a socket, (shown by dotted lines in Fig. 1,) into which socket fits loosely the end of a pin, $t'$, which plays through an oscillating guide, $u'$, formed in a projection, $v'$, on the arm $o'$. Around the pin $t'$ is a spiral spring, (see Fig. 1,) the upper end of which is secured to the upper part of the pin, and the lower end of the said spring bears upon the oscillating guide $u'$, the whole forming a spring-toggle for permitting the pawl to be turned or set to bring either beak or extremity of the pawl into gear with the rag-wheel to reverse the direction in which the rag-wheel and the toothed wheel $k^2$ (which, as before described, is the feeding-instrument in this machine) are moved, the spring holding the pawl in gear when so set. By this means the cloth or other material is permitted to be moved under the needle from left to right, or vice versa, by reversing the operation of the feeding mechanism by moving one of its members without the necessity of stopping the machine or of disorganizing or reorganizing it. This feature has been found practically of great convenience and utility, as it allows double or parallel seams to be sewed without cutting the thread or changing the material end for end in the machine, and, besides, enables the operator always to dispose of the bulk of material outside of the line of sewing by turning it from instead of into or toward the machine. It may also be remarked, in this connection, that in sewing back and forth it is important that the presser-pad or cloth-holder should be made so as to press on the cloth on all sides of the needle, since if an opening or slit were left in the cloth-holder the cloth would be liable to catch or be wrinkled up by being caught against the edge thereof.

To provide for the removal of the shuttle from the raceway, a slot is provided in the table $x'$ above the raceway, and this slot is fitted with a movable plate, Y', which may be in one or more pieces, and which, when in place, has its upper surface flush with the upper surface of the table $x'$, so as to constitute, in effect, a portion of the said table. When this plate is removed and the pointed arms $i$ $i$ are thrown back the shuttle may be taken out; but when the plate is in place and the machine in operation the said plate protects the shuttle-race from dirt and prevents the cloth or material being sewed from interfering with the shuttle.

The seam produced in this machine has the shuttle-thread running directly through the loops of the needle-thread or wound round each loop, according to the direction of the feed movement. When the feed movement is in the opposite direction to that in which the shuttle enters between the needle and its thread the shuttle-thread is left running directly through the loops of the needle-thread; but when the feed movement is in the reverse direction the shuttle-thread is left wound once round each loop of the needle-thread.

I do not claim the use in a sewing-machine of an eye-pointed needle or a shuttle, or the combination of the eye-pointed needle and shuttle; nor do I claim broadly the use of a toothed instrument of any form for the purpose of feeding the material to be sewed; but

What I claim as the invention of the said WILLIAM H. AKINS and JACOB D. FELTHOUSEN, and desire to secure by Letters Patent, is—

1. The combination of the needle-bar of a sewing-machine with a spring to draw up the needle after the stitch is formed for the purpose of tightening the stitches, substantially as set forth.

2. The combination of the stitch-forming mechanism and spool-spindle with an intermittent thread-gripping mechanism located between the spool-spindle and the place where the stitch is formed, substantially as set forth.

3. The combination of the needle-bar and shuttle-driver of a sewing-machine with mechanism for operating them in such manner that the shuttle is caused to enter between the needle and its thread, while the needle is arrested after having made a short retrograde movement.

4. The combination, in a sewing-machine, of the stitch-forming mechanism with a cylindrical rest for the purpose of supporting articles of curved or tubular form, substantially as set forth.

5. The combination of a toothed feeding-instrument with reversible driving mechanism, substantially as set forth.

In testimony whereof I, the assignee of the invention of the aforesaid WILLIAM H. AKINS and J. D. FELTHOUSEN, have hereunto set my hand.

R. G. FAIRBANKS,
*Assignee.*

Witnesses:
E. S. RENWICK,
W. L. BENNEM.